(12) United States Patent
Daubrawa et al.

(10) Patent No.: US 8,179,308 B2
(45) Date of Patent: May 15, 2012

(54) METHOD AND APPARATUS FOR OPTIMIZING THE ACCURACY OF POSITION DETERMINATION AND REDUCING THE INTEGRITY RISK OF A RECEIVER IN A GLOBAL SATELLITE NAVIGATION SYSTEM

(75) Inventors: Julian Daubrawa, Munich (DE); Jan M. W. Krueger, Munich (DE)

(73) Assignee: Astrium GmbH, Taufkirchen (DE)

( * ) Notice: Subject to any disclaimer, the term of this patent is extended or adjusted under 35 U.S.C. 154(b) by 505 days.

(21) Appl. No.: 12/538,596

(22) Filed: Aug. 10, 2009

(65) Prior Publication Data

US 2010/0156720 A1    Jun. 24, 2010

(30) Foreign Application Priority Data

Aug. 11, 2008    (DE) .......................... 10 2008 037 174

(51) Int. Cl.
*G01S 19/40*    (2010.01)
(52) U.S. Cl. .................................................. 342/357.23
(58) Field of Classification Search .............. 342/357.23
See application file for complete search history.

(56) References Cited

U.S. PATENT DOCUMENTS

| | | | | |
|---|---|---|---|---|
| 6,515,618 | B1 * | 2/2003 | Lupash ..................... | 342/357.29 |
| 7,400,292 | B2 * | 7/2008 | DiLellio ................... | 342/357.31 |
| 2007/0285310 | A1 * | 12/2007 | Trautenberg et al. ..... | 342/357.12 |
| 2008/0074318 | A1 * | 3/2008 | Trautenberg .............. | 342/357.02 |
| 2008/0288167 | A1 * | 11/2008 | Trautenberg et al. ..... | 701/214 |
| 2009/0135055 | A1 * | 5/2009 | Trautenberg .............. | 342/357.02 |
| 2010/0033369 | A1 * | 2/2010 | Trautenberg .............. | 342/357.03 |

FOREIGN PATENT DOCUMENTS

| | | |
|---|---|---|
| DE | 10 2007 050 716 A1 | 4/2009 |
| WO | WO 2005/088332 A2 | 9/2005 |

OTHER PUBLICATIONS

Veit Oehler, et al., "The Galileo Integrity Concept and Performance", Galileo-Industries GmbH, 2005, pp. (Six (6) pages).

(Continued)

*Primary Examiner* — Thomas Tarcza
*Assistant Examiner* — Frank McGue
(74) *Attorney, Agent, or Firm* — Crowell & Moring LLP

(57) ABSTRACT

In a method for optimizing the accuracy of position determination, and/or for reducing the integrity risk, of a receiver in a global satellite navigation system having a plurality of satellites, for at least one satellite that is visible to the receiver (E), a deviation error (AF) is determined which is a function of the geometric orientation of the satellite relative to the receiver, and of at least one system parameter. The deviation error is determined based on an additional deviation error generated by an error projection into a coordinate system of the receiver. A first or a second value, whichever is smaller of the two, is used as the deviation error. The first value for the at least one system parameter is determined using a respective specified parameter value. The second value is determined for the at least one system parameter, using a modified parameter value which is modified with respect to the specified parameter value in such a way that a lower error in the modified parameter value of the at least one system parameter is accepted as true.

7 Claims, 2 Drawing Sheets

OTHER PUBLICATIONS

C. Hernández et al., "GALILEO Integrity: The Ground Segment Computation Algorithm Perspective", ION GNSS 19$^{th}$ International Technical Meeting of the Satellite Division, Sep. 26-29, 2006, Fort Worth, TX, pp. 2634-2645, XP-002521139.

Alvaro Mozo García et al., "Galileo Navigation and Integrity Algorithms", ION GNSS 18$^{th}$ International Technical Meeting of the Satellite Division, Sep. 13-16, 2005, Long Beach, CA, pp. 1315-1326, XP-002557094.

Veit Oehler at al., "Galileo System Design & Performance", ION GNSS 19$^{th}$ International Technical Meeting of the Satellite Division, Sep. 26-29, 2006, Fort Worth, TX, pp. 492-503, XP-002505282.

Veit Oehler et al., "User integrity Risk Calculation at the Alert Limit without Fixed Allocations", ION GNSS 17$^{th}$ International Technical Meeting of the Satellite Division, Sep. 21-24, 2004, Long Beach, CA, pp. 1645-1652, XP-002375519.

European Search Report dated Dec. 2, 2009 w/partial translation (eight (8) pages).

\* cited by examiner

METHOD AND APPARATUS FOR OPTIMIZING THE ACCURACY OF POSITION DETERMINATION AND REDUCING THE INTEGRITY RISK OF A RECEIVER IN A GLOBAL SATELLITE NAVIGATION SYSTEM

BACKGROUND AND SUMMARY OF THE INVENTION

This application claims priority under 35 U.S.C. §119 to German Patent Application No. 10 2008 037 174.2-55, filed Aug. 11, 2008, the entire disclosure of which is herein expressly incorporated by reference.

The invention relates to a method and apparatus for enhancing the accuracy of position determination, or for reducing the integrity risk, of a receiver in a global satellite navigation system having a plurality of satellites.

In such a global satellite navigation system, the satellites communicate their exact position and the time of day to a receiver via radio. Position determination requires that the receiver simultaneously receive such signals from at least four independent satellites. The instantaneous position and time of day may be derived by computer in the receiver, by measuring the four times of receipt of the satellite signals as accurately as possible.

Since the respective location of a satellite, and thus its distance from the earth, constantly changes, these parameters cannot be determined directly by the receiver. Instead, each satellite recognizes its instantaneous position, which may be regularly compared by a base station. The distance of a satellite from the receiver is deduced from the signal transit time. Each of the satellites continuously emits its navigation data and a time signal. By comparing with its own clock, the receiver knows how long it took for the signal to reach it. The exact time may be derived from the time signals from the satellites. Therefore, position determination requires not just three, but four satellites in order to determine the three spatial coordinates (x, y, z) in the coordinate system used, as well as the exact time. The geographical longitude, geographical latitude, and the height above the defined reference ellipsoid may then be computed from the spatial coordinates. In other words, on the basis of the navigation data the receiver computes the position of the satellite within the determined or specified error limits, using an orbit model for any point in time within the period of validity of the navigation data.

One of the most important system parameters of a global navigation satellite system (GNSS) is its global availability, which is a function of various factors. It is noteworthy, however, that the signal transit time of the signals emitted by the satellites is altered by the atmosphere. This influence may be partially corrected by the fact that the receiver evaluates signals which are transmitted by a satellite at different frequencies. In principle, the accuracy of the position determination increases when the receiver is able to receive signals from more than four satellites (referred to as "overdetermined localization"); however, this is not always possible. In practice, on account of these influences the global availability cannot always be maintained at 100%.

One object of the present invention, therefore, is to provided a method and apparatus which achieve a high-integrity position solution, with a specified probability, for cases in which the global satellite navigation system is not available.

The present invention provides a method for optimizing the accuracy of the position determination, and/or for reducing the integrity risk, of a receiver in a global satellite navigation system having a plurality of satellites. In the method according to the invention, for at least one satellite that is visible to the receiver, a deviation error is determined as a function of the geometric orientation of the satellite relative to the receiver and of at least one system parameter. The deviation error is determined on the basis of an additional deviation error by means of an error projection into a coordinate system of the receiver. A first or a second value, whichever is smaller, is used as the deviation error. The first value for the at least one system parameter is determined using a respective specified parameter value. The second value is determined for the at least one system parameter, using a modified parameter value (that is, a parameter value which is modified relative to the specified parameter value in such a way that a lower error in the modified parameter value of the at least one system parameter is accepted as true).

The deviation error represents a projected error. The additional deviation error, from which the deviation error is determined, represents a so-called range error, also referred to as user equivalent range error (UERE).

The method according to the invention has the advantage that the accuracy of the position determination may be optimized and/or the integrity risk of the receiver may be reduced in a global satellite navigation system, without additional effort with regard to the necessary system components. The gain in performance may be realized solely by computational means. In this regard the invention allows a portion of the points in time, which typically would not be available, to be found as available without jeopardizing the conservative approach of the positioning. The only "costs" of the invention lie in additional computing expenditure for determining the second value of the deviation error. This determination or computation is preferably carried out in the receiver.

The invention is based on the consideration that by their nature, the navigation data transmitted via the satellites are considered to be upper or lower limits for error modeling, in order to ensure a conservative approach at any point in time. The invention is based on the fact that the position solution projected into the coordinate system of the receiver may in many cases be improved by a more extensive (i.e., increasingly conservative) degradation of the error budget (i.e., the upper or lower limits) of the at least one system parameter.

A SISA ("signal-in-space accuracy") value, for example, may be considered as a system parameter. For example, by increasing the SISA value used in the receiver, which on the system side may be much better (i.e., smaller) in a navigation message transmitted by a particular satellite, the integrity risk of a so-called Safety of Life (SoL) service position solution may be greatly reduced. Alternatively, a SISMA value may also be considered as a system parameter. In addition, an integrity parameter may be used as a system parameter in the proposed method. Such integrity parameters are also known as "thresholds."

It is also practical for the at least one system parameter to be transmitted to the receiver by each particular satellite.

The geometric orientation of the satellite relative to the receiver includes in particular an elevation angle and/or an azimuth angle.

The method according to the invention may be carried in a particularly simple manner and without additional system components when the deviation error (i.e., the projected error), is determined by the receiver.

According to a further advantageous embodiment, a respective deviation error is determined for all or a portion of the satellites that are visible to the receiver.

The invention further provides a device for optimizing the accuracy of position determination, and/or for reducing the integrity risk, of a receiver in a global satellite navigation system having a plurality of satellites, and means for carrying out the above-described method. In particular, this device is provided in the receiver of a global satellite navigation system.

Other objects, advantages and novel features of the present invention will become apparent from the following detailed description of the invention when considered in conjunction with the accompanying drawings.

DETAILED DESCRIPTION OF THE DRAWINGS

The exemplary embodiment is described herein using an example of four satellites (RF1, RF2, RF3, RF4). However, the invention is not limited to the case of four satellites, and is applicable to any given number of satellites. In particular, the number of satellites that are visible to a receiver is a system parameter, the selection of which may be used in a targeted manner to achieve a gain in performance for a subset of satellites.

Figure 1:
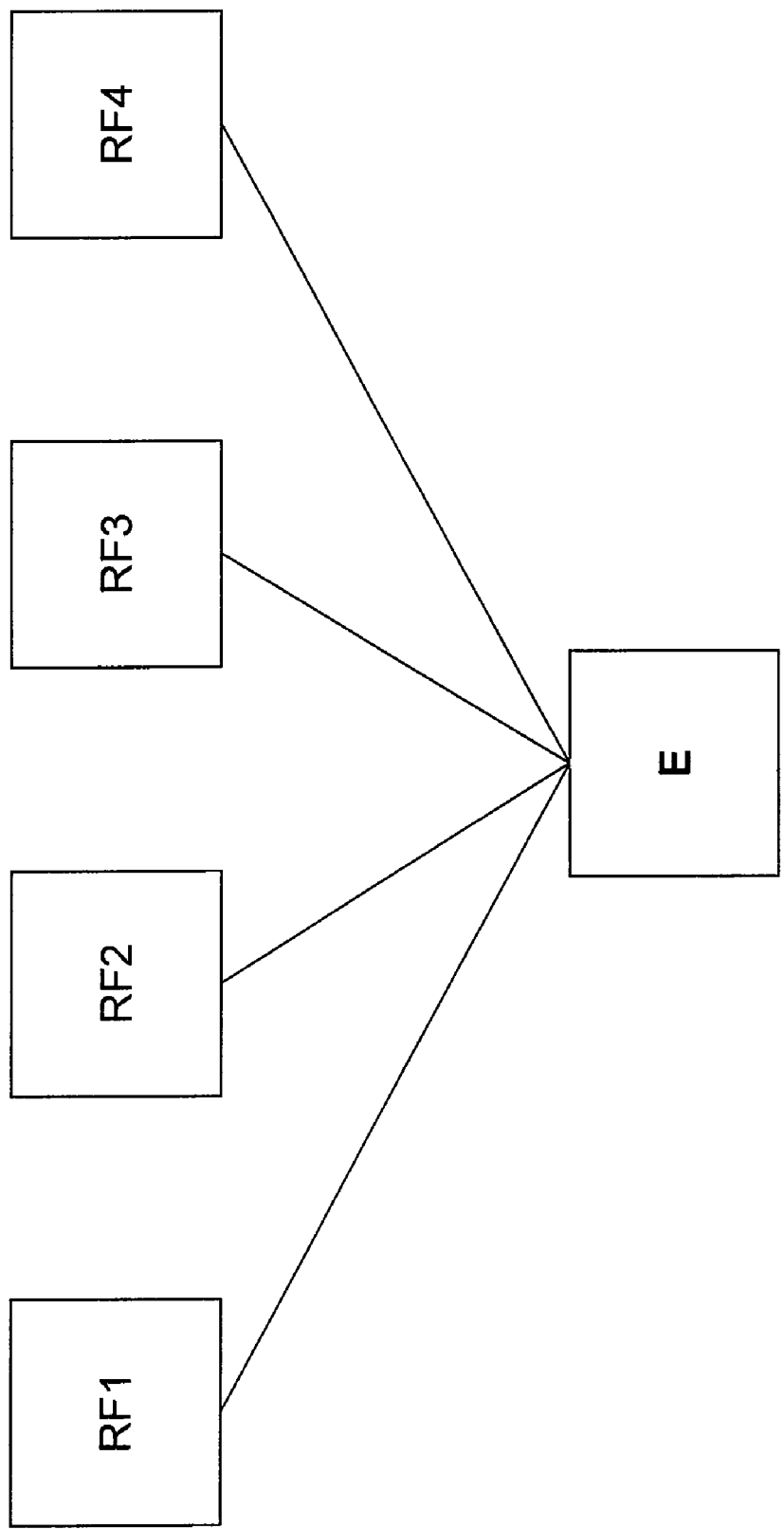
FIG. 1 shows a schematic illustration of a global satellite navigation system for carrying out the method according to the invention.

FIG. 1 shows a schematic illustration of a global satellite navigation system, having a receiver E which in the exemplary embodiment receives navigation signals from four satellites RF1, RF2, RF3, and RF4. (It is assumed that only satellites RF1, RF2, RF3, and RF4 are visible to the receiver E; however, the global satellite navigation system also includes a number of additional satellites, not illustrated in FIG. 1, which are not visible to the receiver E). The receiver E determines for each of the visible satellites RF1, RF2, RF3, and RF4, based on its respective navigation signal, a deviation error which essentially is a function of the respective geometric orientation of the satellites RF1, RF2, RF3, RF4 relative to the receiver E and of at least one system parameter, in particular a SISA value that is transmitted by the respective satellites.

The receiver E is able to determine for each of the satellites RF1, RF2, RF3, and RF4 a deviation error AF', i.e., a so-called range error, for the geometric orientation GA of the respective satellite relative to the receiver E. For this purpose, data (in the form of a table or curves) are stored in the receiver E for each of the satellites RF1, RF2, RF3, RF4 which reflect a previously determined correlation of the geometric orientation GA with the deviation error AF'. This is illustrated for one satellite by way of example in the left diagram of FIG. 2. The geometric orientation GA, in particular the elevation angle, of the satellite in question relative to the receiver E is plotted on the x axis. The deviation error AF' in centimeters is plotted on the y axis (generally for a measurement of length). The curve decreases in an approximately exponential function, although this is strictly an example. This curve takes into account one or more system parameters such as a SISA value, which may be derived as a function of the system parameter transmitted by the satellite and adapted to the transmitted system parameter(s).

Figure 2:
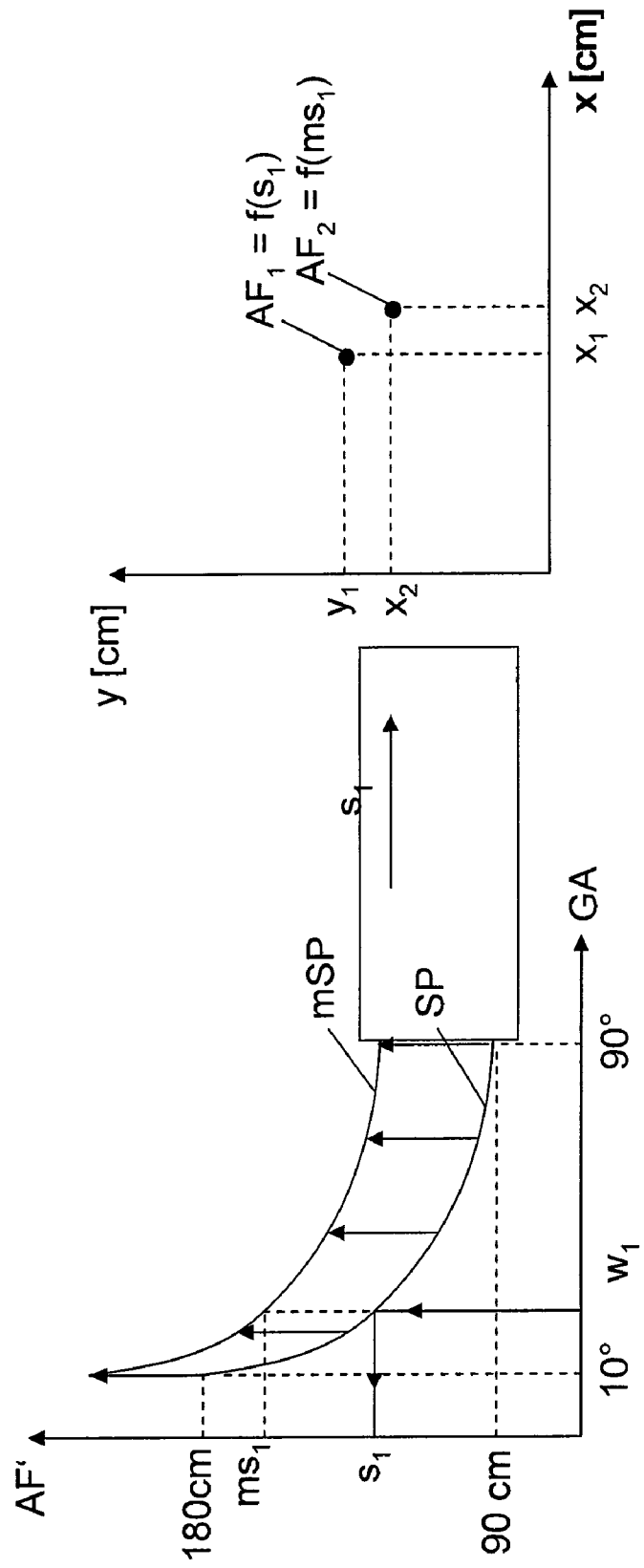
FIG. 2 shows two diagrams which schematically explain the determination of a deviation error for a satellite that is visible to the receiver.

For a system parameter transmitted by the satellite, FIG. 2 illustrates, for example, the curve SP which has been determined and for which the following is valid in the present exemplary embodiment: For an elevation angle of 10°, the deviation to be taken into account by the receiver E is approximately 180 cm. For an elevation angle of 90°, the deviation error AF' to be taken into account by the receiver E is approximately 90 cm. In general, for a determined elevation angle $w_1$ the receiver E is able to determine a corresponding parameter value $s_1$ for the deviation error AF'. When the receiver E has determined the parameter value $s_1$ for the satellite, this value may be used to determine a projected error $AF_1$, whereby the error projection performs a transformation into an x-y coordinate system of the receiver E. This is illustrated schematically in the right diagram in FIG. 2, and is carried out by the receiver E.

When a navigation signal is received from a satellite, the receiver E also receives at least one system parameter from the affected satellite. This system parameter may be a SISA value, a SISMA value, or another integrity parameter, for example. In the description which follows it is assumed that a SISA value is used for optimizing the accuracy of the position determination or reducing the integrity risk of the receiver E. When the SISA value is received, the receiver E—as explained—temporarily modifies the standard curve that is stored for a given SISA value (not illustrated). The old SISA value contained in the standard curve is factored out, and the SISA value that is transmitted by the satellite is taken into account, resulting in a linear shift of the standard curve (see curve SP). Only then is the previously described conversion to the user coordinate system performed for determining the actual deviation error AF.

According to the invention, not only is the deviation error $AF_1$ for the SISA value transmitted by the satellite determined, but also a conservative assumption for the SISA value is made before the temporary modification of the standard curve. This means that a larger SISA value is used than would be necessary per se for reliably determining the accuracy of the position. This likewise results in the previously described linear shift of the standard curve, upward relative to the curve SP. This modified curve is denoted by reference character mSP in FIG. 2, and characterizes the modification of the system parameter. A modified parameter value $ms_1$ is once again determined for the determined elevation angle $w_1$. From $ms_1$ a deviation error $AF_2$ is determined, which is a function of the modified parameter value $ms_1$. Whichever value is smaller is used as the deviation error AF.

This additional projection computation, which includes the determination of a second value for the deviation error in the coordinate system of the receiver, does not consume much computing capacity, and may be independently performed in the receiver E. By assuming a larger error for the system parameter (a more conservative assumption), in many cases this results in a lower projected error, which is important for the receiver E. This conservative assumption, which corresponds to a degradation of the error budget, allows an improvement of the signals, which assist in positioning of the receiver, [introduced] into the receiver coordinate system. Thus, for example, by increasing the SISA value used in the receiver E, which on the system side may be much better (i.e., smaller) in the navigation message, the integrity risk or the accuracy of the position determination may be respectively reduced or improved. In this manner a portion of the points in time, which typically would not be available, may be found as available without jeopardizing the conservative approach of the positioning. In this regard, the only "costs" of the method, as mentioned, lie in the computing expenditure for the receiver E.

Thus, optimizing the accuracy of the position determination and/or the reduction of the integrity risk for a receiver in a global satellite navigation system requires only the necessary curves for each satellite, which curves describe the range error as a function of the elevation, to be present in a receiver, as well as further system parameters which are transmitted in the navigation message from the satellite(s) to the receiver E. The further system parameters are typically not a function of the elevation, and therefore do not result in a linear shift of the standard curve. In many cases this results in an improved projected deviation error.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for optimizing the accuracy of position determination or for reducing the integrity risk of a global navigation satellite receiver in a global satellite navigation system having a plurality of satellites, said method comprising:
   determining, by the global navigation satellite receiver for at least one satellite that is visible to the receiver, a deviation error as a function of geometric orientation of the satellite relative to the receiver, and of at least one system parameter;
   determining, by the global navigation satellite receiver, the deviation error on the basis of an additional deviation error generated by an error projection into a coordinate system of the receiver, wherein a first or a second value of said at least one system parameter, whichever is smaller, is used to determine the deviation error;
   determining, by the global navigation satellite receiver, the first value for the at least one system parameter using a respective specified parameter value; and
   determining, by the global navigation satellite receiver, the second value for the at least one system parameter using a modified parameter value which is modified with respect to the specified parameter value in such a way that a lower error in the modified parameter value of the at least one system parameter is accepted as true.

2. The method according to claim 1, wherein the at least one system parameter is a signal-in-space accuracy (SISA) value.

3. The method according to claim 1, wherein the at least one system parameter is a SISMA value.

4. The method according to claim 1, wherein the at least one system parameter is an integrity parameter.

5. The method according to claim 1, further comprising transmitting the at least one system parameter from the respective satellite to the receiver.

6. The method according to claim 1, wherein the geometric orientation of the satellite relative to the receiver includes an elevation angle and/or an azimuth angle.

7. The method according to claim 1, further comprising determining a respective deviation error for all or a portion of the satellites that are visible to the receiver.

* * * * *